Figure 1:
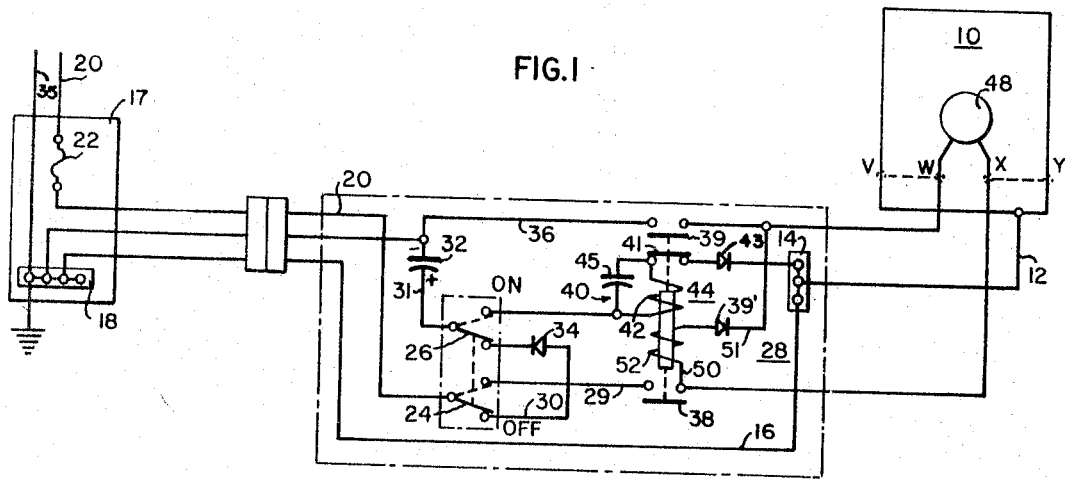

May 16, 1967   C. W. FAILOR   3,320,480
GROUND WIRE MONITORING SYSTEM
Filed Feb. 11, 1965

INVENTOR
CHARLES W. FAILOR
BY
Webb, Burden, Robinson & Webb
ATTORNEYS

United States Patent Office 3,320,480
Patented May 16, 1967

3,320,480
GROUND WIRE MONITORING SYSTEM
Charles W. Failor, 107 Elmore Road,
Pittsburgh, Pa. 15221
Filed Feb. 11, 1965, Ser. No. 431,816
10 Claims. (Cl. 317—18)

This invention relates to improvements in the grounding of appliances and relates in particular to a new and novel ground monitoring system for 115 volt alternating current electrical devices.

Electrical appliances, such as portable tools, which may be employed in a basement having a damp floor or may be used out of doors on damp ground or grass can at any instant become a death hazard if not properly connected and used. A fault or short circuit occurring between the hot or live wire from the electrical outlet and the metal housing of the appliance can be, and frequently is, fatal to a person in contact with the housing where the appliance is not properly grounded. All portable tools are now required by the national Electric Code and the Underwriters' Laboratories (insurance companies) to have three-wire cords, one of which is intended to carry a fault voltage to the ground in the case of trouble. The three-wire cord terminals terminate in a three-prong plug which fits into an appropriate three-hole receptacle. If the receptacle is properly wired, the third prong grounds the housing of the appliance so that if a fault occurs, a branch fuse or circuit breaker in the hot line at the home service panel is caused to interrupt current flow from the step-down transfer transformer so that electrical shock suffered by one in contact with the device is of short duration.

If the three-hole receptacle or the three-pronged plug is not available, adaptor plugs may be employed for the utilization of a standard indoor two-hole receptacle. These plugs are designed with two prongs to fit into the standard two-hole receptacle. They are also provided with a three-hole receptacle for receiving the three-pronged plugs. A ground wire leading from the adaptor is intended to be fastened to the metal housing of the receptacle and the receptacle, if properly installed, should be grounded to a ground provided at the home service panel. All too frequently a fault or interruption occurs in the ground between the service receptacle and the home service panel, or the ground hole of the receptacle is not properly wired to the service panel, or in the case of adaptor plugs, the plug is not actually in communication with the outlet or housing. Additionally, the outlet or housing of the conventional receptacle sometimes is not properly grounded when installed. There is no way for the appliance user to know when one of these conditions exists until a fault occurs and then, of course, it is too late to remedy the situation.

Additionally, many individuals ignore installation of the ground wire of the adaptor plugs so that the hazardous condition exists through ordinary carelessness.

Prior known systems for insuring proper grounding of appliances are both complex and unreliable. I have devised a monitoring system for monitoring the continuity of the ground wire leading from the appliance housing to the ground at the home service panels. If a separate and independent ground is provided to the appliance housing, my monitoring system will monitor this ground. With my device, an appliance will not operate or alternating current will not be supplied to the electricity consuming unit so as to constitute a hazard if the appliance housing is not properly grounded. Further, my device may be utilized in conjunction with adaptor plugs which may be inadvertently plugged in upside down so as to reverse the polarity of the current supplied the appliance.

In general, my device consists of a monitoring circuit, a portion of which is in communication with the white or return wire of the service and the hot line when the appliance is turned off. A diode and capacitor are positioned in series in this portion of the circuit so that the capacitor is charged with direct current. When the appliance is turned on, if the ground wire is continuous, the capacitor discharges through a coil to the ground and the coil activates the appliance.

Figure 2:
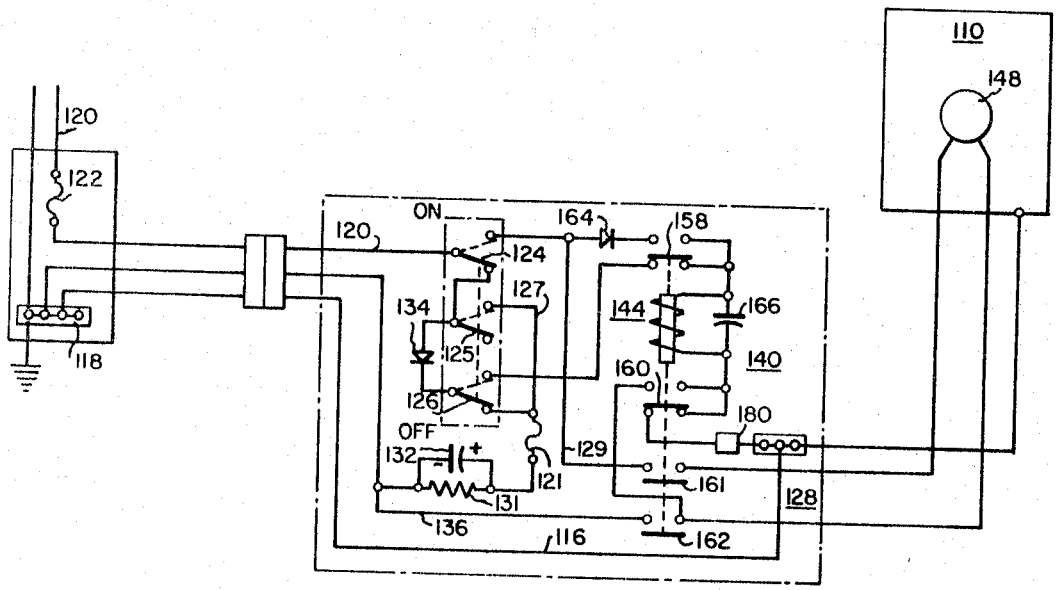

I have shown the present preferred embodiment of my invention in the accompanying drawings, in which:

FIGURE 1 is a circuit diagram illustrating a monitoring circuit which falls within the scope of the present invention; and FIGURE 2 is a circuit diagram showing a second embodiment of the present invention that is provided with a monitoring circuit falling within the scope of the present invention.

In the circuit of FIGURE 1, an appliance frame 10 is shown to be grounded by a wire 12, strap 14, and ground wire 16 to the grounding terminal strip 18 of the home or building service panel. So long as the wires 12 and 16 remain continuous to the ground of strip 18, the housing 10 is at substantially zero potential. If a fault or short occurs between the live or hot lead 20 coming from the transformer, a branch circuit fuse 22 will blow so that a person in bodily contact with the housing 10 will not be subjected to severe shock such as is occasioned by current flowing from housing 10 to ground through the individual himself.

Switches 24 and 26 are preferably a single multi-contact switch disposed to complete the circuit between the black or hot lead wire 20 and the power unit circuit 28 while disrupting the continuity between hot line 20 and conductor 30 substantially simultaneously. Thus, when such a multi-contact switch is the switch of an appliance and is in its "off" position, it is substantially as shown by FIGURE 1. When such a multi-contact switch is switched to the "on" position, switches 24 and 26 are in the position shown by dotted outline.

When the appliance switch is in its "off" position as shown by FIG. 1, direct current is provided to the capacitor 32 within conductor 31 by means of hot line 20, rectifying diode 34 and grounded line 35 of the secondary distribution system. Capacitor 32 is of the voltage current storing variety disposed to build up a voltage charge when supplied with rectified half-wave direct current voltage such as supplied through lead 30 and diode 34.

When the appliance switch is positioned in the "on" position so that switches 24 and 26 are as shown in dotted outline in FIG. 1, the black or hot line from the transformer communicates with the power unit circuit 28. However, current does not pass from the conductor 29 to the return conductor 36 of circuit 28 so long as the circuit is interrupted by open contacts 38 and 39. If, however, ground wire 16 is continuous between the housing 10 and the ground of the service panel 17, or if the housing has been otherwise properly grounded, then when switch 26 is closed (dotted outline in FIG. 1) capacitor 32 discharges its voltage through the monitoring circuit 40 including the upper winding 42 of a dual wound relay 44 through contact 41 and ground wire 16 to strip 18 and ground or to an independently provided ground for housing 10. The momentary flow of direct current through winding 42 causes relay 44 to momentarily close contacts 38 and 39 so that alternating current flow is established between conductor 29 and return 36 of circuit 28 so as to energize motor 48 (power unit) of the appliance. Current flow is also established from conductor 29 to return 36 through conductors 50 and 51 and the lower winding 52 of the dual wound relay 44. A diode 39' is positioned in series with the winding 52 of relay 44 to provide direct current to the winding rather than alternating current. The latter current flow keeps the relay contacts 38 and 39 closed so that the appliance continues to be energized until switches 24 and 26 of the dual contact switch of the appliance is turned to the "off" position, whereupon relay 44 is deenergized, contacts 38 and 39 open, contact 41 closes, and the capacitor is recharged to test the continuity of ground wire 16 or other ground the next time the appliance switch is turned on.

Preferably a capacitor such as capacitor 45 is positioned in parallel with the upper winding 42 of relay 44 to hold the voltage discharge from capacitor 32 across the winding 42 for a sufficient time to assure that contacts 38 and 39 will close after contact 41 has opened.

If the appliance is turned on (switches 24 and 26) and wire 16 is not continuous, or the ground plug is improperly wired so that the wire 16 does not run to strip 18 of the home panel, and some other ground for housing 10 is not provided, capacitor 32 will not discharge through winding 42 because an adequate ground is nonexistent and contacts 38 and 39 will not close because relay 44 is not energized.

Thus, the appliance of FIG. 1 will not start or be energized so long as ground wire 16 is not continuous to the ground of strip 18 or the housing is not otherwise adequately grounded.

The presence of contact 39 is preferred since if a fault occurs at V-W and contact 39 is nonexistent, the discharge of capacitor 32 may find its way through the monitoring circuit, conductor 12, housing 10, fault V-W to return conductor 36 and the negative pole of capacitor 32 so as to energize relay 44 and close contact 38 even though the housing 10 is not grounded. If the fault occurs at X-Y, the current surge may also include conductor 50, the lower winding of relay 52 to return 36 and the negative pole of capacitor 32.

Since more than one appliance may be grounded to the ground of service panel 17, it may be preferred to include a blocking diode 43 which is disposed to block the output of a similar capacitor of a parallel connected monitor connected to the same ground wire. This diode precludes mutual interference between monitors when several monitors are connected to one ground wire.

The embodiment of FIGURE 2 is fundamentally the same as that of FIGURE 1 but includes preferred modifications of the present invention. In the circuit of this embodiment, a single winding, four-contact relay 144, is employed in lieu of the double winding relay 44 of the circuit of FIG. 1.

The relay contacts 160 and 158 are utilized in lieu of the second relay windings 52 of relay 44 in the embodiment of FIG. 1. These contacts or switches condition a monitoring circuit 140 when relay 144 is not energized. However, when relay 144 is energized, the contacts 158, 160, 161 and 162 rise to interrupt the monitoring circuit 140 and to complete a circuit of alternating current to the power unit of an appliance and maintain energization of the relay.

In this embodiment when the appliance switch (switches 124, 125, and 126) is in the "on" position (shown by FIG. 2 in dotted outline), electrical current does not flow from the black or "hot" lead 120 through circuit 128 and the appliance motor 148 unless contacts 161 and 162 are closed to complete the circuit from conductor 129 to return 136. These contacts or switches close only upon energization of relay 144. Capacitor 132, as in the case of capacitor 32, is wired in series with a rectifying diode 134 and receives rectified or halfwave direct current from hot lead 120 when the appliance switch (switches 124, 125, and 126) is in its "off" position. Before discharging through monitoring circuit 140, however, the current from capacitor 132 is discharged through a third switch 125 which in this embodiment is part of the main switch (preferably a three-pole switch), so that the direct current discharge passes through the rectifying diode 134 a second time prior to surging through the monitoring circuit 140 and relay 144. The purpose of such construction will not be immediately apparent but will be more fully explained and described herebelow.

When the appliance switch (switches 124, 125, and 126) is thrown to its "on" position (dotted outline in FIG. 2), capacitor 132 discharges in the manner described through switch 125, diode 134 and switch 126, monitoring circuit 140 through relay 144 to the ground.

The surge of direct current from capacitor 132 (assuming ground wire 116 to be continuous) through the single winding of relay 144 causes this relay to retract its plunger and raise the contacts 160, 158, 161 and 162. This interrupts the monitoring circuit 140 both before and after its conductors pass through the winding of relay 144 but completes the alternating current circuit through motor 148. Contacts 160 and 158, however, rise to complete a circuit between the alternating current conductor 120 and the winding of relay 144 which leads to the white return 136. Thus, a current is maintained through the single winding of relay 144 so that the relay continues to be energized and contacts 161 and 162 continue to be closed so that the power unit consisting of motor 148 of the appliance continues to be energized.

Alternating current surging through a relay, such as relay 144, which is designed to be energized by the direct current surge from capacitor 132 has a tendency to cause the contacts, such as contacts 160, 158, 161 and 162, to chatter. Consequently, a diode 164 similar to diode 134 is positioned in the circuit in such a manner as to provide direct current to the relay 144 rather than alternating current such as is employed in conjunction with the power unit consisting of motor 148.

To assure that contacts 158 and 160 will rise and complete the circuit and will not close prematurely so as to deenergize the alternating current circuit 128, a capacitor 166 is positioned in parallel with relay 144 in the monitoring circuit.

Thus, it will be readily appreciated that the power unit 148 of the appliance of FIG. 2 is operative only if the ground wire 116 is continuous or if the housing 110 is otherwise adequately grounded. If the appliance is plugged in and the ground wire prong is not in communication with the ground wire 116 or if the ground wire 116 is not continuous to the ground of strip 118, unless the housing 110 is otherwise grounded, contacts 161 and 162 will not close and the appliance will not be energized so that a fault between the hot line and the appliance frame 110 cannot occur. If, on the other hand, the ground prong is grounded and the appliance is energized in the manner described above, so that relay 144 is energized to complete the circuit to the power unit 148, the existence of a fault will blow the branch circuit fuse 122 rather than shock the individual in contact with the frame 110.

If the diode 134 is defective or shorts, a capacitor such as capacitor 132 will not arc because of its low capacitive reactance, and the resulting high current will cause branch circuit fuse 122 to blow. An auxiliary fuse 121 of less than 15 amperes may be employed between the capacitor 132 and diode 134 to provide additional protection for the appliance user. Diode 134 also precludes current being supplied to wire 116 by parallel monitors thereby avoiding mutual interference between monitoring systems.

In the above discussion in regards to both the embodiments of FIG. 1 and FIG. 2, it has been assumed that the appliance live hot wire 120 was connected to the residential service black wire, and that the appliance white return ground wire was connected to the residential white ground wire. Certain types of appliance adaptor plugs, however, are susceptible to being reversed so that the appliance black live wire 129 can be connected to the residential white grounded return wire and the appliance white wire 136 can be connected to the residential black live wire 120. Should the appliance adaptor plug be connected to the residential receptacle in such a fashion to transpose the wiring as described above, the negative side of capacitor 132 is momentarily connected to the black live residential wire in lieu of being connected to the white grounded wire as previously described. In this event, 115 volt alternating current from the hot line 120 flows into the appliance through lead 136. Such current flows to the negative pole of capacitor 132 and through a resistor 131. Diode 134 performs the same function it previously performed in maintaining the current unidirectional and effecting a charge within capacitor 132. When the appliance switches (124, 125, and 126) of the appliance is thrown to the "on" position, capacitor 132 discharges through the monitoring circuit 140 in its usual fashion (providing, of course, that ground wire 116 is continuous). Additionally, current flow through conductor 127 and switch 126 to monitoring circuit 140 is rectified by half-wave direct current by rectifier 134 so that the relay 144 reacts to raise contacts 158, 160, 161 and 162 so as to complete the aforementioned circuits and energize motor 148.

Should the appliance of FIG. 1 be plugged into the home service so that the hot line 20 communicates with return conductor 36 of circuit 28 rather than conductor 29 and conductor 29 is continuous with white return 35, the monitoring circuit will continue to function. Capacitor 32 will not pass the alternating current from conductor 36 but will acquire a direct current voltage charge which will discharge through the monitoring circuit when the appliance is turned on in the usual fashion (if the appliance housing is properly grounded) to open contact 41 and close contacts 38 and 39. Current then flows through circuit 28 in reverse.

The preferred embodiment of FIGURE 2 shows a high value resistor 131 wired in parallel with capacitor 132. The function of resistor 131 is to discharge capacitor 132.

In the event the ground wire (16 or 116) is not continuous, the capacitor (32 or 132) will not discharge its voltage to such an extent to energize the power unit of the appliance, however, some discharge can be expected, particularly if an individual is in contact with the appliance housing under grounding environmental circumstances. A relay (44 or 144) may be readily selected that requires a greater discharge than that effected in opposition to the impedance offered by an individual. Such a direct current discharge to the housing of the appliance is low voltage and short duration so that its shocking effect is minor.

A controlled monitoring pulse can be provided to minimize the electric shock described above which might be experienced if the ground wire is discontinuous. A zener diode, as indicated by block 180 of FIG. 2, can be connected between the monitoring circuit leading to the ground wire to limit the duration and magnitude of electrical energy supplied to the ground wire and to reduce the final voltage. Additionally, a conventional silicon controlled type rectifier can be employed in place of or in combination with a zener diode at block 180 to reduce the final voltage to zero.

A wide variety of well-known and commercially available components, such as diodes and capacitors, may be employed in conjunction with the embodiments of FIGURES 1 and 2. One skilled in the electrical or electronic arts will have no difficulty in making adequate selections. I have had particular success in using a Cornell-Dubilier CDE Beaver electrolytic capacitor, type 3BR 100–250, 100 mfd., 250 w. var D.C. as capacitor 32 or 132. A Westinghouse semi-conductor 1N1222 CN has proved to be a satisfactory current rectifying diode for use as diodes 34, 134, 39' and 164. As relay 144, I may use an electromagnetic relay, Series 200, contact assembly No. 200–M2 amp., with 2000 ohm coil assembly, 110 v.–D.C., No. 200–110D, Guardian Electric, Inc., modified to include two additional normally open contacts. For resistors, I used Ohmite Dividohm, 50 watt, 10,000 ohms.

While I have shown and described the preferred embodiments of my invention, it may be otherwise embodied within the scope of the appended claims.

I claim:

1. In an electrical appliance having a power unit circuit consisting of conductors to conduct electricity from the black hot line of a normally 115 volt alternating current power source to the white return line through the power unit of said appliance, a multi-contact "on-off" appliance switch and means for grounding the housing of said appliance, the improvement in combination therewith of a ground monitoring device comprising:
   (a) first conductor means disposed to connect the black hot service to the white return and including said multi-contact switch for interrupting and completing the circuit of said first conductor;
   (b) a diode within said first conductor means to convert alternating current from said black hot service to direct current;
   (c) a capacitor within said first conductor means disposed to receive and retain voltage from said direct current and discharge said voltage through said conductor means to ground when connected thereto;
   (d) second conductor means disposed to connect said first conductor means to said housing and ground when said multi-contact switch is in the "on" position so as to cause said capacitor to discharge its voltage to said ground;
   (e) contact means for interrupting and completing the circuit of said second conductor means; and
   (f) means within said second conductor means disposed to close said contact means and thereby complete said power unit circuit when said capacitor discharges its voltage through said second conductor means.

2. A device as set forth in claim 1 wherein said multi-contact appliance switch is a two-contact switch so that when said appliance switch is in its "off" position, said first conductor means completes a circuit between said hot black line and said white return line while said second conductor means is interrupted from contact with said first conductor means and when said switch is in its "on" position, said first conductor means is interrupted from contact with said hot black line while said second conductor means completes a circuit between said first conductor means and said ground.

3. A device as set forth in claim 2 wherein said means (f) within said second conductor means disposed to complete said power unit circuit when capacitor discharges its voltage through said second conductor consists of a dual wound relay one winding of which is continuous with said second conductor means, and said contact means (e) for interrupting said power unit circuit consists of normally open contacts within said power unit circuit that are closed by said relay when it is energized by said capacitor discharging its voltage through said second conductor means, the ends of the other winding of said dual wound relay leading to said power unit circuit so that when said relay closes said contacts to complete said power unit circuit, electrical current will flow through said second relay winding and maintain said contacts closed.

4. A device as set forth in claim 2 wherein said contact means (f) within said second conductor means disposed to complete said power unit circuit when said capacitor discharges its voltage, consists of a single winding relay and said means for interrupting said power unit circuit consists of normally open first contacts positioned on either side of said power unit, said contacts being disposed to be closed by activation of said relay upon discharge of said capacitor, third conductor means leading from said power unit circuit to said second conductor means, second normally open contacts disposed to be closed by said relay when activated positioned in said third conductor means on either side of said relay, third normally closed contacts positioned in said second conductor means on either side of said relay disposed to be opened by said relay when activated by said capacitor so that if said ground is intact when the appliance is switched to its "on" position, said capacitor will discharge its voltage to said relay closing the normally open contacts and opening the normally closed contacts to maintain said relay as activated and complete said power unit circuit.

5. A device as set forth in claim 3 wherein an alternating current rectifying diode is positioned in series with the second winding of said dual wound relay to provide direct current to said winding when said power unit circuit is activated.

6. A device as set forth in claim 4 wherein an alternating current rectifying diode is positioned in series with said relay when said second normally open contacts are closed to provide direct current to said winding when said power unit circuit is activated.

7. A device as set forth in claim 3 wherein a capacitor is positioned in parallel with the first winding of said relay, said capacitor being disposed to extend the time of energization of said relay when said capacitor in said first conductor means discharges its voltage to ground.

8. A device as set forth in claim 4 wherein a capacitor is positioned in parallel with the first winding of said relay, said capacitor being disposed to extend the time of energization of said relay when said capacitor in said first conductor means discharges its voltage to ground.

9. A device as set forth in claim 1 wherein said second conductor means includes a diode positioned between said means (f) and said ground, said diode being disposed to pass the current discharge of said capacitor to ground but block a current charge flowing in a reverse direction so as to block energy from parallel connected monitoring devices.

10. A device as set forth in claim 1 wherein said second conductor means includes at least one electronic component selected from the group consisting of a zener diode and a silicon controlled rectifier positioned between said means (f) and said ground, said component being disposed to limit the magnitude and duration of said current discharge from said capacitor and to terminate said discharge.

References Cited by the Examiner
UNITED STATES PATENTS 2,554,598   5/1951   Storch _____ 317—18

MILTON O. HIRSHFIELD, *Primary Examiner.*

J. D. TRAMMELL, *Assistant Examiner.*